US012776229B2

(12) United States Patent
Livingston

(10) Patent No.: US 12,776,229 B2
(45) Date of Patent: Oct. 27, 2026

(54) SYSTEM AND APPARATUS FOR VARYING HOT MELT ADHESIVE COAT WEIGHTS ON A LABEL

(71) Applicant: Iconex LLC, Duluth, GA (US)

(72) Inventor: Timothy Darren Livingston, Corryton, TN (US)

(73) Assignee: Iconex LLC, Morristown, TN (US)

( * ) Notice: Subject to any disclaimer, the term of this patent is extended or adjusted under 35 U.S.C. 154(b) by 362 days.

(21) Appl. No.: 18/473,698

(22) Filed: Sep. 25, 2023

(65) Prior Publication Data

US 2025/0104577 A1 Mar. 27, 2025

(51) Int. Cl.

*G09F 3/10* (2006.01)
*B23D 1/08* (2006.01)
*G09F 3/02* (2006.01)

(52) U.S. Cl.

CPC ................. *G09F 3/10* (2013.01); *B23D 1/08* (2013.01); *G09F 3/02* (2013.01); *G09F 2003/025* (2013.01)

(58) Field of Classification Search

CPC ......... G09F 3/10; G09F 3/02; G09F 2003/025
See application file for complete search history.

(56) References Cited

U.S. PATENT DOCUMENTS 5,423,935 A 6/1995 Benecke et al.
8,840,984 B1 * 9/2014 Umphlett ................. B41M 1/40 428/32.11
10,726,746 B1 7/2020 Crum
11,559,975 B1 * 1/2023 Crum ......................... B32B 7/14
2003/0089452 A1 * 5/2003 Hansen ................. B65C 9/1896 156/268
2004/0091659 A1 * 5/2004 Banks ...................... G07F 17/26 428/40.1
2011/0151115 A1 6/2011 Lingier
2013/0260991 A1 * 10/2013 Van Boom ................ B05C 1/16 428/206
2017/0092160 A1 * 3/2017 Kruchko ................... B32B 3/10
2020/0005681 A1 * 1/2020 Jeske ...................... B41M 3/006
2023/0108262 A1 * 4/2023 Tiainen ...................... G09F 3/10 40/638
2025/0297140 A1 * 9/2025 Kivimäki ................. C09J 7/385

FOREIGN PATENT DOCUMENTS

WO 2022058083 3/2022
WO 2025072198 4/2025

OTHER PUBLICATIONS

"International Application Serial No. PCT US2024 048207, Invitation to Pay Additional Fees mailed Dec. 17, 2024", 2 pgs.
"International Application Serial No. PCT US2024 048207, International Search Report mailed Feb. 13, 2025", 3 pgs.
"International Application Serial No. PCT US2024 048207, Written Opinion mailed Feb. 13, 2025", 8 pgs.

* cited by examiner

*Primary Examiner* — Gary C Hoge
(74) *Attorney, Agent, or Firm* — Schwegman Lundberg & Woessner, P.A.

(57) ABSTRACT

A label with varying degrees of adhesive coat weights is provided. A backside of the label includes first channel areas in which there is no adhesive. The backside of the label also includes second channel areas in which the adhesive is flood coated. Furthermore, the backside of the label includes third channels in which the adhesive is disposed in a coat weight that is less than what is achieved via flood coating.

12 Claims, 8 Drawing Sheets

SYSTEM AND APPARATUS FOR VARYING HOT MELT ADHESIVE COAT WEIGHTS ON A LABEL

BACKGROUND

Label capabilities are dependent upon a variety of adhesive-based factors, such as adhesive type, adhesive pattern, adhesive patch shapes, adhesive flood coat, adhesive coat weight, mixtures of adhesives, and adhesive activation mechanism (e.g., pressure, heat, etc.). Capabilities that require a high tack are often obtained through using a high tack adhesive that is flood coated on a backside of the label.

Hot melt adhesive is a high tack adhesive often flood coated on the backsides of shipping labels. Hot melt adhesives bond to diverse ranges of substrates (cardboard, metal, plastics, fabric, paper, wood, etc.), which is why tapes use hot melt adhesive. Hot melt adhesive is difficult to work with due to its viscosity during application to backsides of labels, which is why labels that typically include a hot melt adhesive are flood coated on the backsides of the labels. However, flood coating hot melt adhesive on the backsides of labels requires utilization of more adhesive product, which increases label manufacturing costs. Additionally, hot melt adhesive that covers the edges of the label can melt in hot operating environments cause the adhesive to leak or ooze around the edges of the label.

SUMMARY

In various embodiments, a system and apparatus are provided for varying hot melt adhesive coat weights on a backside of a label. In an embodiment, a label is provided that includes varying adhesive coat weights disposed on the backside of the label. First channels along the backside of the label include no adhesive, second channels along the backside of the label include an adhesive of a first coat weight, and third channels along the backside of the label include a second coat weight. The first coat weight is greater than the second coat weight. In an embodiment, the first coat weight is equivalent to a flood coating of the adhesive in the second channels.

DETAILED DESCRIPTION

Hot melt adhesive is typically flood coated on the backsides of labels. Flood coating requires more adhesive product and is therefore expensive for label manufacturers. Additionally, flood coated edges of a label can be problematic in warm or hot operating environments in which the glue, around the edges, melts, and oozes out from the edges.

These issues are solved with the labels provided herein. The labels include lanes of varying coat weights for hot melt adhesive on the backsides of the labels. Experimentation has revealed that the coverage area and location of the lanes with varying coat weights on the backside of a label actually increases the label's peel force by 50% and requires approximately 20% less hot melt adhesive than a conventional flood coated hot melt adhesive label. Thus, the varying coat weights of hot melt adhesive on a label improves performance of the label and also reduces the amount of hot melt adhesive needed to manufacture the label.

Figure 1A:
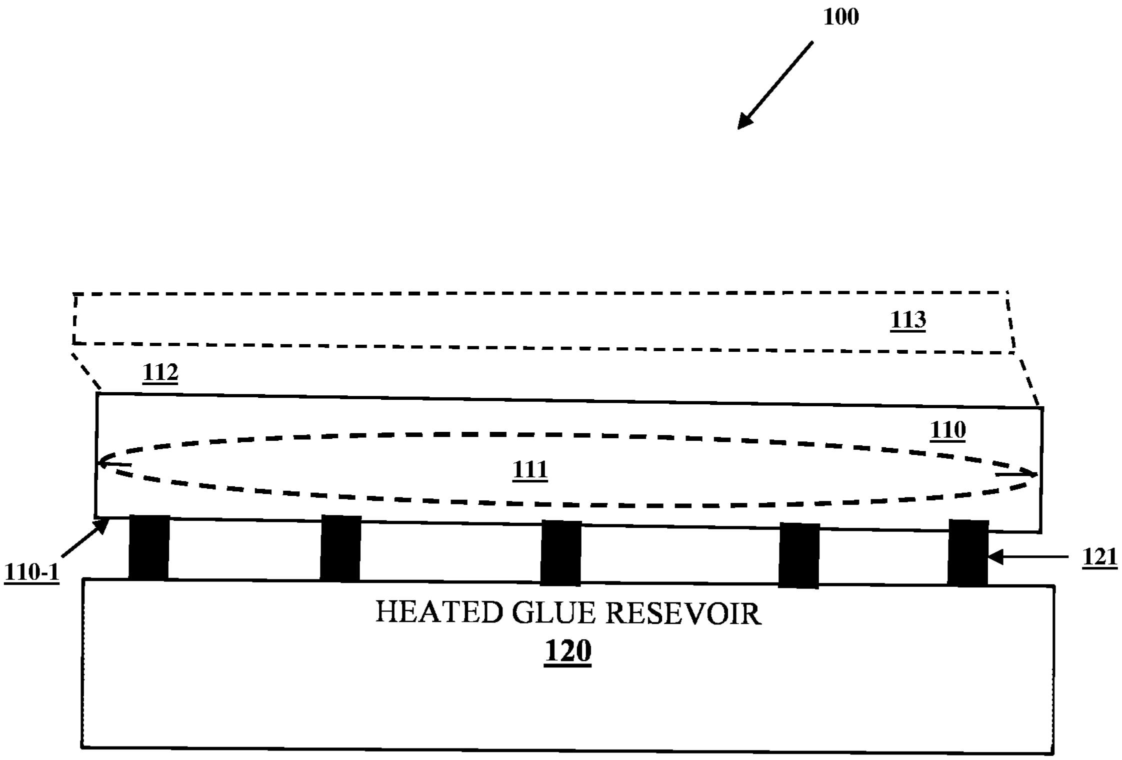
FIG. 1A is a diagram of a bottom unit of a hot melt adhesive slot die attached to a reservoir of hot melt adhesive, according to an example embodiment.

FIG. 1A is a diagram of a bottom unit 100 of a hot melt adhesive slot die attached to a reservoir of hot melt adhesive 120, according to an example embodiment. The bottom unit includes a flat horizontal top surface 110, attached to a vertical wall 112, and attached to a horizontal shelf 113. The top surface 110 further includes an aperture or hole 111. The reservoir 120 heats hot melt adhesive and pumps a liquid form of the adhesive up through aperture 111 through tubes or hoses 121 onto remaining portions of the top surface 110.

Figure 1B:
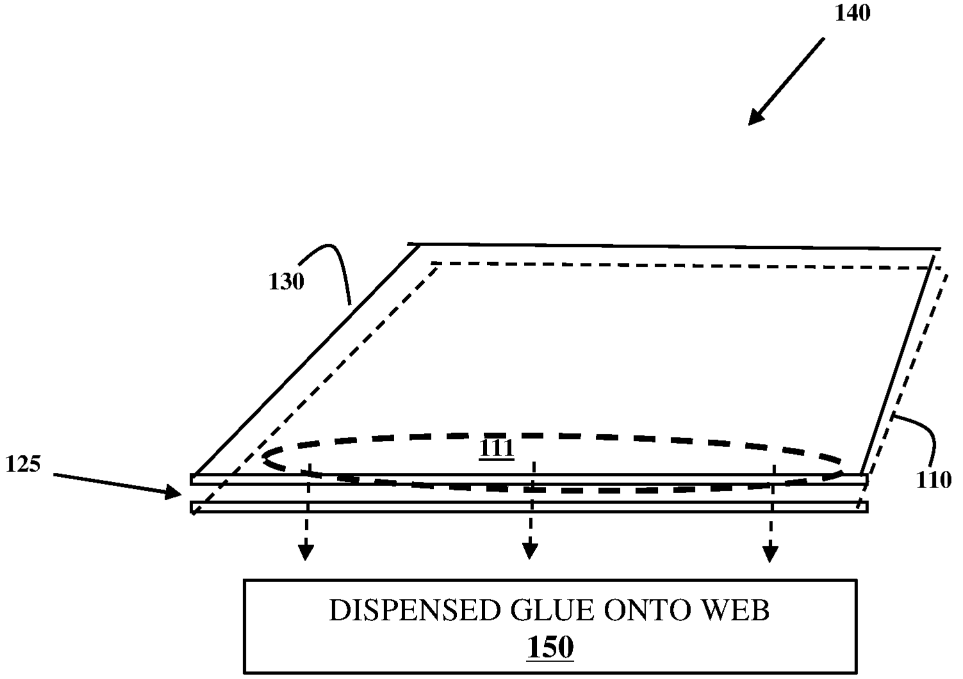
FIG. 1B is a diagram of a top plate for a top unit of the slot die pressing down on a top surface of the bottom unit and dispense hot melt adhesive, according to an example embodiment.

The liquid hot melt adhesive oozes up through aperture 111 onto the lip 110-1 of top surface 110. FIG. 1B is a diagram 140 of a top plate 130 for a top unit of the slot die pressing down on a top surface 110 of the bottom unit 100 and dispenses hot melt adhesive, according to an example embodiment. The liquid hot melt adhesive is dispensed through a slot 125 created when the top plate 130 is pressed down onto the top surface 110 of the bottom unit 100. A web of label substrate is urged adjacent to and in contact with slot 125 and the hot melt adhesive/glue is dispensed, transferred, or deposited onto a backside of the web 150.

Figure 2:
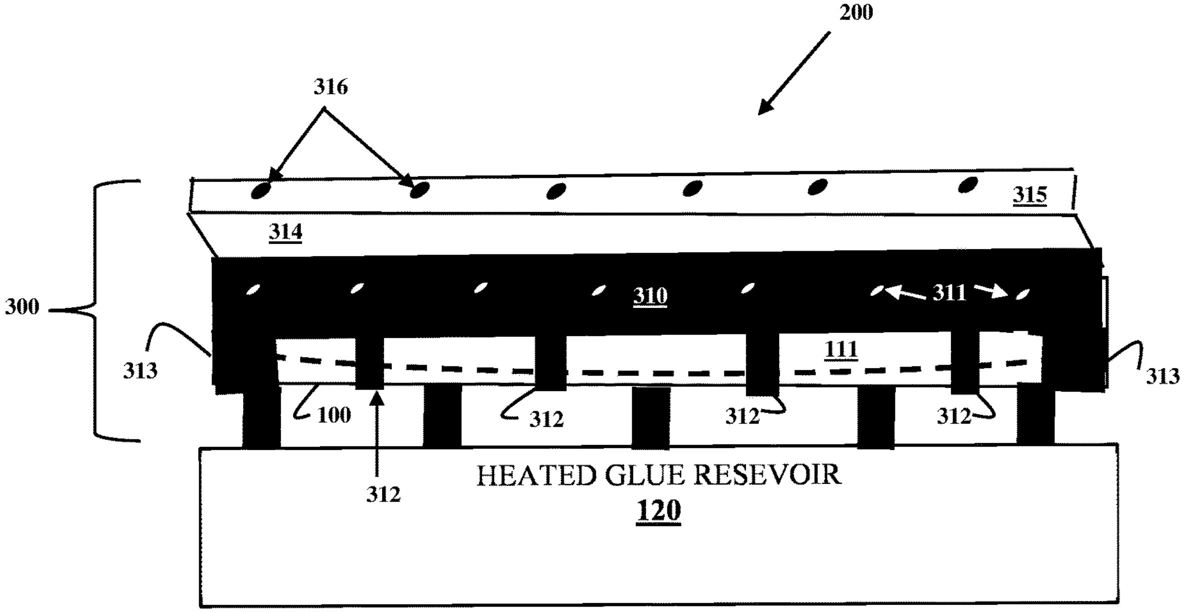
FIG. 2 is a diagram of a system with an apparatus covering a top surface of the bottom unit to vary the flow of hot melt adhesive dispensed through the slot die, according to an example embodiment.

FIG. 2 is a diagram of a system 200 with an apparatus 300 covering a top surface 110 of the bottom unit 100 to vary the flow of hot melt adhesive dispensed through the slot die, according to an example embodiment. The system 200 includes the bottom unit 100 and an apparatus 300 which covers the bottom unit 100 such that the bottom unit 100 is barely visible in FIG. 2.

The apparatus 300 includes a horizontal top surface 310 which covers and is laid onto of the top surface 110 of the bottom unit 100. Similarly, the apparatus 300 includes a vertical wall 314 that covers and sits in front of vertical wall 112 of the bottom unit 100. Moreover, the apparatus 300 includes a horizontal wall or shelf 314 that sits on top of horizontal wall or shelf 113 of the bottom unit.

The apparatus 300 is affixed to the bottom unit through manufactured apertures or holes 311 in the top surface 310 and apertures or holes 316 in the shelf 315. Thus, bolts, screws, or other fasteners securely attach apparatus 300 on top of bottom unit 100.

When the top plate 130 of the top unit for the slot die is pressed down onto the top surface 110 of the bottom unit 100, the apparatus 300 is sandwiched in between the underside of the top plate and the top surface 110 of the bottom unit 100. Thus, the apparatus 300 is similar to a customized shim placed in between the bottom unit 100 and the top unit of the slot die.

Figure 3A:
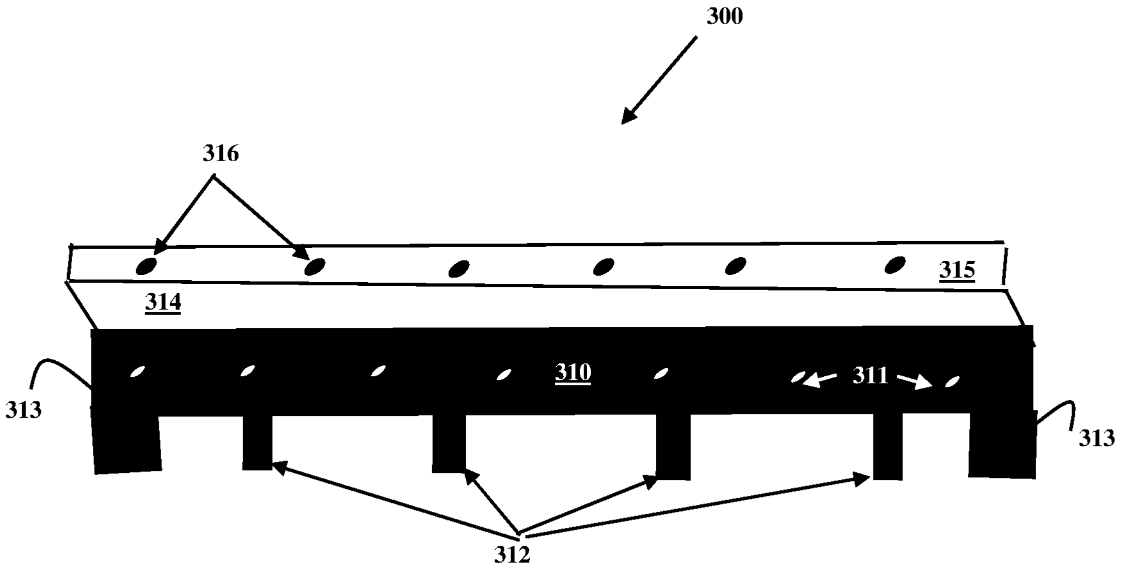
FIG. 3A is a diagram of an apparatus for varying the flow of hot melt adhesive dispensed through the slot die, according to an example embodiment.

FIG. 3A is a diagram of an apparatus 300 for varying the flow of hot melt adhesive dispensed through the slot die, according to an example embodiment. FIG. 3 illustrates the apparatus 300 without the bottom unit of the slot die.

The top surface 310 includes side edge appendages 313 that are sized to extend out over and cover aperture 111 (e.g., the hole from which the hot melt adhesive in liquid form bubbles or oozes up onto the top surface 110 and over lip 110-1. This is illustrated in FIG. 2. Thus, when top plate 130 is pushed against apparatus 300, hot melt adhesive is blocked from exiting the slot along the side edge appendages 313.

Top surface 310 also includes additional extending appendages 312 that also cover corresponding portions of aperture 111. This ensures that only partial or no hot melt adhesive is pushed over lip 110-1 and out through slot 125 onto the web of label substrate in areas across the web that correspond to appendages 312.

Figure 3B:
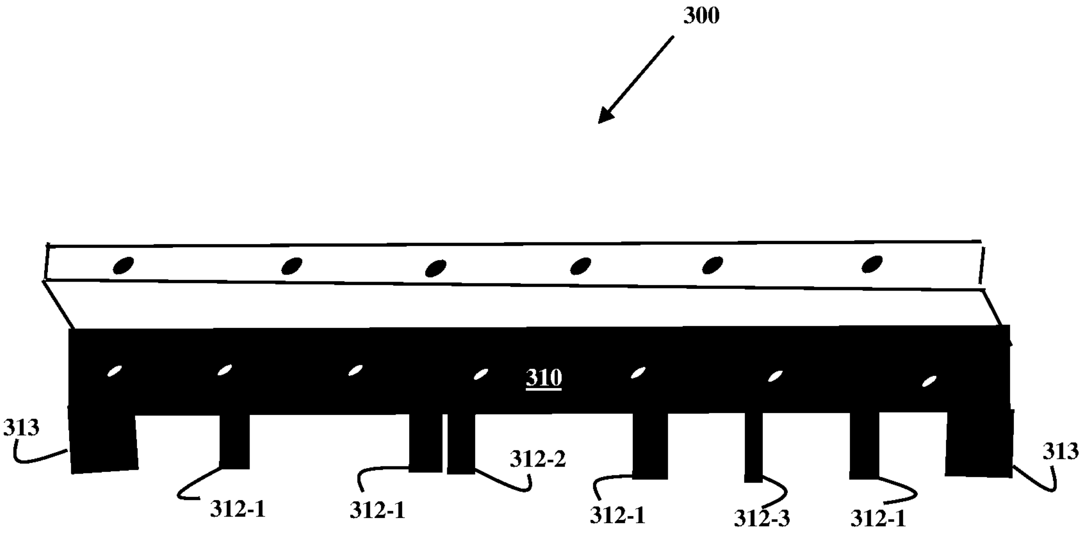
FIG. 3B is a diagram of another apparatus for varying the flow of hot melt adhesive dispensed through the slot die, according to an example embodiment.

FIG. 3B is a diagram of another apparatus 300 for varying the flow of hot melt adhesive dispensed through the slot die, according to an example embodiment. The apparatus 300 illustrated can include multiple different sized extending appendages 312-1, 312-2, and 312-3.

Notably, the apparatus 300 can include more or less extending appendages 312-1, 312-2, and 313-2 from what is illustrated. Furthermore, the widths of the appendages 312-1, 312-2, and 313-2 can vary to cover more or less of the aperture 111 associated with the hot melt glue reservoir 120.

Figure 3C:
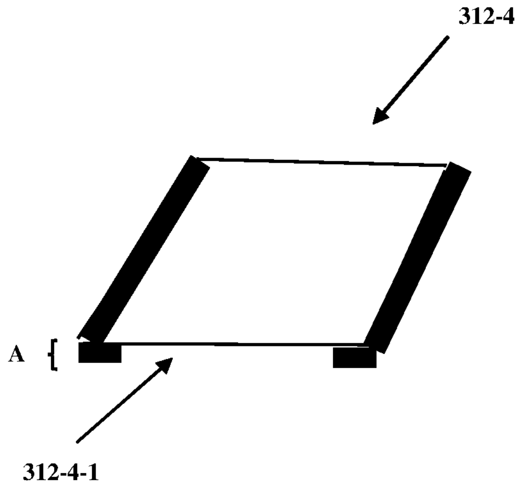
FIG. 3C is a diagram of a component of an apparatus with a channel cut out to vary a thickness of the component, according to an example embodiment.

FIG. 3C is a diagram of an extending appendage 312-4 of an apparatus 300 with a channel cut out to vary a thickness of the component, according to an example embodiment. A bottom surface of the appendage 312-4 is milled to reduce its thickness A and create a channel 312-4-1 in the bottom surface. The channel 312-4-1 opening is directed toward the slot 125 and the thickness A of the channel 312-4-1 can vary. The height or thickness A of the channel 312-4-1 dictates the amount of hot melt adhesive that is dispensed through the slot 125 onto the web, which controls the coat weight of the dispensed adhesive onto the web. The channel 312-4-1 permits hot melt adhesive to flow at a reduced rate out of slot 125, the reduced rate is less than what is achieved with other unblocked or unimpeded areas of the slot not associated with any extending appendage 312, 312-1, 312-2, 312-3, and 313.

Hot melt adhesive is pumped up from the glue reservoir 120 through aperture 111 of a slot die's bottom unit 100 to overflow the liquid glue onto the top surface 110 of the bottom unit. A top plate 130 of the slot die's top unit presses down onto the top surface 100 with apparatus 300 overlaid and affixed to the top surface 110 of the bottom unit 100. This causes the glue to be dispensed or ejected out of slot 125 onto a backside surface of a web of label substrate for labels. The two side edges 313 and the extending appendages 312, 312-1, 312-2, 313-3, and 312-4 completely block and/or partially block the flow of glue that exits the slot 125 onto the label substrate. When the flow is partially blocked via an extending appendage 312-4 via a manufactured or milled underside channel 312-4-1, the amount of glue that flows is dependent upon the thickness A of the channel 312-4-1. This results in the backside surface of the label substrate having no glue in first areas where the flow of glue was completely blocked by extending appendages 313, 312-1, 312-2, 312-3, full flood coated glue in second areas where there was not extending appendage, and lower coat weighted glue from the second areas in third areas where there was an extending appendage 312-4 with a carved-out underside channel 312-4-1.

Once now appreciates how apparatus 300 can be custom manufactured or adjusted to manufacture a roll of labels with each label in the roll having varying coat weights of hot melt adhesive glue disposed thereon. The apparatus 300 is an overlay or a shim manufactured to fit on top of a top surface 110 of a bottom unit 100 for a hot melt slot die. The apparatus 300 includes a variety of extending appendages that completely cover or partially cover the aperture 111 from which hot melt glue in liquid form is pumped from a hot melt glue reservoir 120. In an embodiment, at least one of the extending appendages 312-4 includes a carved-out underside channel 312-4-1 that partially restricts but does not completely restrict the flow of glue out of slot 125 when a top plate 130 for a top unit of the slot die is pressed down onto the top surface 110 of the bottom unit 100.

The overlay 300 is adapted to be affixed to the top surface 110 of a bottom unit 100 for a slot die device or machine of a label press. Each end of the overlay 300 includes the edge extending appendages 313 to ensure the flow of hot melt adhesive does not flow out of the slot 125 in areas that are blocked by appendages 313. In between the edge extending appendages 313 are two or more additional extending appendages 312, 312-, 312-3, 312-3, and/or 312-4, which either completely block the flow of adhesive out of the slot 125 or partially restrict and reduce the flow of adhesive out of the slot. Appendage 312-4 includes channel 321-4-1 which partially restricts or reduces the flow of adhesive out of slot 125 but does not completely block the flow of adhesive.

In an embodiment, the apparatus 300 has a length that is at least equal to the length of aperture 111 of top surface 110 for the bottom unit of a slot die. The extending appendages 313, 312, 312-1, 312-2, 312-3, and 312-4 extend to at least a width necessary to cover aperture 111 in selective locations along the aperture 111. In an embodiment, a thickness of any carved-out underside channel 312-4-1 in any extending appendage 312-4 is adjusted to achieve a desired coat weight for the hot melt adhesive on a label substrate in channel areas defined along the substrate that correspond to the extending appendage 312-4 when a web of the substrate passes over or by slot 125.

In an embodiment, the web of a label substrate has a width that corresponds to the length of the slot 125 and the web defines a plurality of rolls of labels, each roll defines a plurality of individual labels. Thus, when a press is manufacturing the labels, the web is passed by or over slot 125 and varying coat weights or no coat weight of glue (i.e., no glue at all) is selectively disposed on the backside of each of labels based on apparatus 300 and the corresponding appendages 313, 312, 312-1, 312-2, 312-3, and/or 312-4. The press cuts the web into individual sheets, and each sheet is would into a roll. Furthermore, within each roll sense marks can be imaged or printed on the backside of the label substrate to delineate and separate each individual label 400 within the roll.

In an embodiment, apparatus 300 is manufactured from a sheet of metal or metal-based material. The sheet of metal is cut to a length and width that corresponds to the slot 125 and the top surface 110 of the bottom unit of a hot melt slot die. Selective portions of the cut sheet of metal are cut out to form the appendages, which selective cover portions of aperture 111 313, 312, 312-1, 312-2, 312-3, and/or 312-4. Any desired appendage 312-4 is then further milled from to achieve channel 312-4-1 with a desired thickness A. Two other sheets of metal are milled for vertical wall 314 and shelf 315. Apertures or holes 311 and 316 are drilled out of the two other sheets of metal. The three sheets of custom cut and milled metal are wielded together to in the arrangement illustrated above in FIG. 3A to form apparatus 300.

Figure 4:
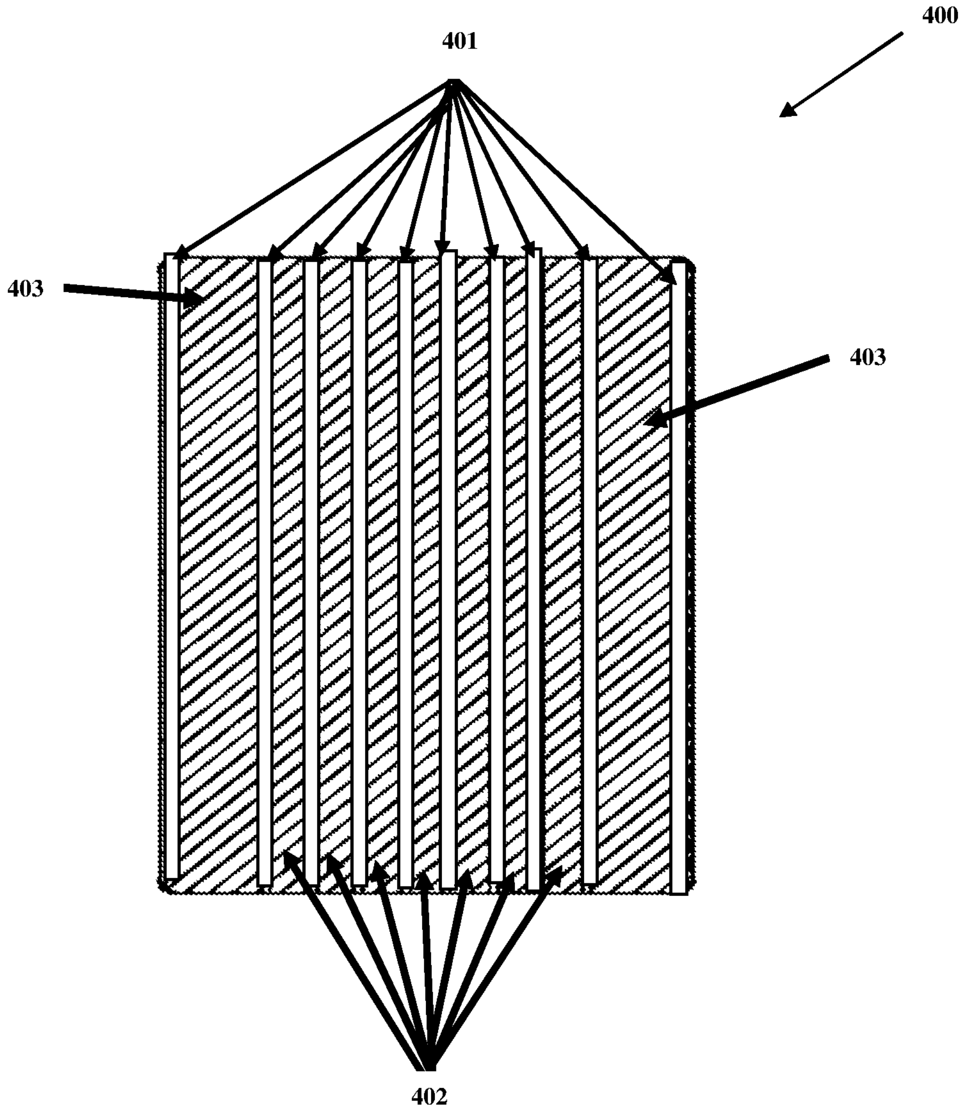
FIG. 4 is an image a of a label with varying adhesive coat weights disposed on a backside of the label, according to an example embodiment.

FIG. 4 is an image of a label 400 with varying adhesive coat weights disposed on a backside of the label 400, according to an example embodiment. The label is manufactured on a press that includes the modified and enhanced slot die with apparatus 300 as discussed above.

The backside of the label 400 with varying coat weights of hot melt adhesive disposed thereon is shown in FIG. 4. First channels 401 appear along a first side, a second side and are evenly distributed in a middle of the backside of the label 400. First channels 401 represent first vertical strip areas for which there is no hot melt adhesive (i.e., adhesive free or devoid of adhesive in the first vertical strip areas). These are channels 401 in which an extending appendage 313, 312, 312-1, 312-2, and/or 312-3 of apparatus 300 completely blocked glue from exiting slot 125 when a web of a label substrate passed by or over the slot 125 of the slot die during manufacturing of the label on a press.

The backside of the label 400 also includes second channels 402. The second channels 402 include a hot melt adhesive coat weight that is less than what would have been achieved with a flood coating of the adhesive. These are channels 402 in which an extending appendage 312-4 included a milled or underside carved-out channel 312-4-1, which restricted the flow of the hot melt adhesive exiting from slot 125 when a web of a label substrate passed by or over the slot 125 of the slot die during manufacturing of the label on a press.

Furthermore, the backside of the label 400 includes third channels 403. The third channels 403 include a full coat weight of hot melt adhesive. These are channels 403 in which there was no extending appendage completely or partially blocking the flow of adhesive out of slot 125 when a web of a label substrate passed by or over the slot 125 of the slot die during manufacturing of the label on a press.

Three of the third channels 403 are illustrated in FIG. 4. A first one of the third channels 403 is adjacent to a first end or side of the backside of the label 400 (i.e., the left-side end or side edge). A second of the third channels 403 is adjacent to an opposing or opposite end or side of the backside of the label 400 (i.e., the right-side end or side edge). A third of the third channels 403 is located or situated substantially in the center or middle channel of the backside of the label 400.

Each of the second channels 402 and third channels 403 are separated by a pair of first channels 401. That is, the channels 401-403 do not intersect of overlap with one another. Stated another way, the only intersection of the channels is between channels 401 and 402 along their sides or 403 and 402 along their sides.

The second channels 402 can be viewed as two sets of three of the second channels 402. Each set of second channels 402 is adjacent to a given first channel along a first side, and the given first channel 401 is further adjacent to a given third channel 403.

In an embodiment, the second channels 402 cover approximately 46.2% of a total area for the backside of the label 400 and the second channels 402 include a hot melt adhesive coat weight of 12 gsm (grams per square meter). In an embodiment, the third channels 403 cover approximately 42.8% of the total area for the backside of the label 400 and the third channels include a hot melt adhesive coat weight of 20 gsm. In an embodiment, the first areas cover approximately 11% of the total area for the backside of the label 400 and the first channels 401 are devoid of any adhesive. Thus, the second channels 402 cover more of a total area of the backside than the third channels 403 and the third channels 403 cover more of the total area then the first channels 401.

In an embodiment, the channeled pattern of varying coat weights on the backside of the label consumes glue on the corresponding press at a rate of 14 gsm. This rate of consuming glue is approximately a 20% reduction in the rate in which a conventional slot die of a press consumes glue when flood coating the glue on the backside of a label.

In an embodiment, label 400 with the varying coat weights of hot melt adhesive/glue has an 50% improvement in peel force over a conventional flood coated hot melt glue label.

In an embodiment, label 400 is a linerless label. In an embodiment, the front side of the label includes a thermally activated print/image coating, which when heat is applied by a thermal printer causes custom indicia to be imaged/printed on the front side of the label.

Notably, two edges of label 400 include a corresponding first channel 401 for which there is no adhesive on the backside of the label 400. This mitigates melting glue from seeping or oozing out sides of the label 400 when the label is used in warm or hot environments.

Notably, the second channels 402 are located in areas of the backside that are less critical, such that the reduced or less than a full coat weight of adhesive does not adversely impact performance of the label 400. The locations of the second channels 402 also prevent wrinkling in the label 400 when the label 400 is adhered to a surface, which is not the case with conventional adhesive patch pattern labels that do wrinkle. However, the reduced coat weights in the second channels 402 along with the first channels 401 where there is no adhesive reduce the amount of adhesive needed to manufacture the label 400. Accordingly, label 400 can be manufactured at a lost cost than a conventional flood coated adhesive label.

Notably, the third channels 403 are located adjacent to the two edges or sides of the label 400 and in a substantial middle of the label 400. This arrangement with a full coat weight of adhesive along the backside of the label 400 maximizes label 400 performance and results in a 20% increase in peel performance over a conventional flood coated adhesive label.

Figure 5:
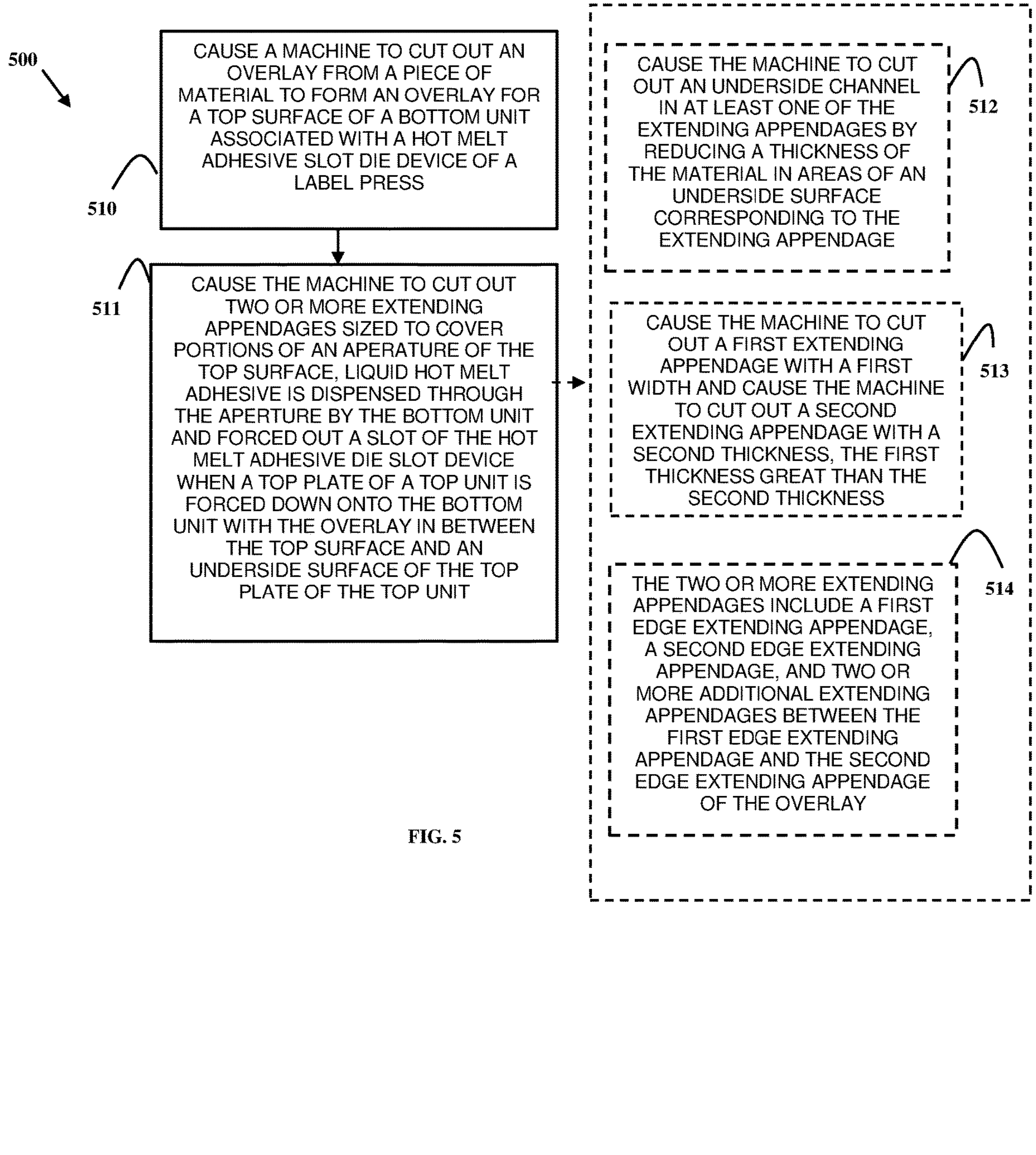
FIG. 5 is a diagram of a method for manufacturing an apparatus for varying hot melt adhesive coat weights on labels of a roll, according to an example embodiment.

FIG. 5 is a diagram of a method 500 for manufacturing an apparatus that varies hot melt adhesive coat weights on labels, according to an example embodiment. The method is implemented on a milling machine through firmware that controls electro-mechanical components of the machine to manufacture apparatus 300. A processor associated with the firmware/software executes instructions to perform the method, to control the electromechanical components of the milling machine, and to produce the apparatus.

The method 500 produces apparatus 300 and when apparatus 300 is integrated into system 200 for a bottom and top unit of a slot die in a press, labels 400 are produced. Each label 400 includes varying coat weights of hot melt adhesive disposed on a backside of the corresponding label 400.

At 510, the processor of the press causes a machine to cut out an overlay from a piece of material to form an overlay for a top surface 110 of a bottom unit 100 associated with a hot melt adhesive slot die device of a label press. The overlay is the apparatus 300 discussed above. In an embodiment, the material is metal, hard heat-resistant plastic, or a composite material made of combinations of metal and/or plastics.

At 511, the processor of the press causes the machine to cut out two or more extending appendages 312, 312-1, 312-2, 313-2, 312-4, and/or 313 sized to cover portions of an aperture 111 of the top surface 110 of the bottom unit 100. Liquid hot melt adhesive is pumped up through the aperture 111 by the bottom unit 110 from a glue reservoir 120 and forced out of a slot 125 of the hot melt adhesive slot die device when a top plate 130 of a top unit is forced down onto the bottom unit 100 with the overlay (i.e., apparatus 300) in between the top surface 110 and an underside surface of a top plate 130 of the top unit.

In an embodiment, at 512, the processor of the press causes the machine to cut out an underside channel 312-4-1 in at least one of the extending appendages 312-4 by reducing a thickness of the material in areas of an underside surface corresponding to the extending appendage 312-4. The channel 312-4-1 was illustrated above in FIG. 3C.

In an embodiment, at 513, the processor of the press causes the machine to cut out a first extending appendage 312-1 or 313 with a first width and causes the machine to cut out a second extending appendage 312-3 with a second width. The first width is greater than the second width.

In an embodiment, at 514, the two or more extending appendages include a first edge extending appendage 313, a second edge extending appendage 313, and two or more additional extending appendages 312, 312-1, 312-2, 312-3, and/or 312-4 between the first edge extending appendage 313 and the second edge extending appendage 313. The edge extending appendages 313 are illustrated above in FIGS. 3A and 3B.

Although the present invention is described with reference to certain preferred embodiments thereof, variations and modifications of the present invention can be affected within the spirit and scope of the following claims.

The invention claimed is:

1. A label, comprising:

a substrate;

an adhesive disposed on a backside of the substrate in multiple channels defined in the backside, wherein first channels include the adhesive disposed on the backside in a first coat weight equivalent to a flood coating of the adhesive and second channels include the adhesive disposed on the backside in a second coat weight, wherein the first coat weight is greater than the second coat weight; and the backside of the label further includes third channels that are devoid of any of the adhesive.

2. The label of claim 1, the label is a linerless label.

3. The label of claim 1, wherein the adhesive is a hot melt adhesive.

4. The label of claim 1, wherein the second channels cover more area on the backside of the label than the first channels.

5. The label of claim 4, wherein the third channels cover less area on the backside of the label than the first channels.

6. The label of claim 1, wherein a first one of the third channels is located along a first end or side edge of the backside and a second one of the third channels is located along an opposing second end or opposing second side edge of the backside of the label.

7. The label of claim 6, wherein the first one of the third channels is adjacent to one of the first channels and the second one of the third channels is adjacent to another first channel.

8. The label of claim 7, wherein each set of second channels is adjacent to a given third channel along a first side, the given third channel is further adjacent to a given first channel.

9. The label of claim 7, wherein the first coat weight is 20 gsm (grams per square meter) and the second coat weight is 12 gsm.

10. The label of claim 9, wherein the first channels cover approximately 42.8% of a total backside area, the second channels cover approximately 46.2% of the total backside area, and the third channels cover approximately 11% of the total backside area.

11. The label of claim 1, wherein each third channel separates a particular first channel and a particular second channel.

12. The label of claim 11, wherein the second channels include two sets of three of the second channels.

* * * * *